(12) United States Patent
Nakamura et al.

(10) Patent No.: US 11,869,362 B2
(45) Date of Patent: Jan. 9, 2024

(54) VEHICLE CONTROL METHOD, VEHICLE CONTROL DEVICE, AND VEHICLE CONTROL SYSTEM

(71) Applicants: Nissan Motor Co., Ltd., Yokohama (JP); RENAULT S.A.S., Boulogne-Billancourt (FR)

(72) Inventors: Masahide Nakamura, Kanagawa (JP); Yutaka Mikuriya, Kanagawa (JP); Yoshitaka Takagi, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/996,225

(22) PCT Filed: Apr. 17, 2020

(86) PCT No.: PCT/IB2020/000372
§ 371 (c)(1),
(2) Date: Oct. 14, 2022

(87) PCT Pub. No.: WO2021/209780
PCT Pub. Date: Oct. 21, 2021

(65) Prior Publication Data
US 2023/0196922 A1 Jun. 22, 2023

(51) Int. Cl.
*G08G 1/00* (2006.01)
(52) U.S. Cl.
CPC ............... *G08G 1/22* (2013.01); *G08G 1/20* (2013.01)
(58) Field of Classification Search
CPC .. G08G 1/22; G08G 1/20; G08G 1/09; G08G 1/123; G08G 1/127; G08G 1/13; G08G 1/202; G06Q 50/30; B60W 60/00253
See application file for complete search history.

(56) References Cited

U.S. PATENT DOCUMENTS

2013/0317733 A1   11/2013   del Pozo de Poza et al.
2015/0081362 A1*   3/2015   Chadwick .............. G06Q 50/30
                                                                 705/7.14
(Continued)

FOREIGN PATENT DOCUMENTS

DE   10 2016 004 566 A1   11/2016
JP   H9-16898 A   1/1997
(Continued)

OTHER PUBLICATIONS

Lienert et al., "Routing-based Sequencing Applied to Shuttle Systems," 2018 21st International Conference on Intelligent Transportation System (ITSC), Nov. 4, 2018, pp. 2949-2954, IEEE, New York.

*Primary Examiner* — Nadeem Odeh
(74) *Attorney, Agent, or Firm* — Global IP Counselors, LLP

(57) ABSTRACT

A controller is configured to set a stopping order of a plurality of vehicles, which indicates the vehicle order at a stop location in a stopping area. The controller is further configured to estimate an arrival order, which indicates the order in which the plurality of vehicles arrive at a prescribed location, based on position information of the plurality of vehicles. The controller is further configured to determine whether the arrival order differs from the stopping order The controller is further configured to control the travel of at least one vehicle from among the plurality of vehicles upon determining that the arrival order differs from the stopping order, such that the arrival order is the same as the stopping order by a time the plurality of vehicles arrive at the prescribed location.

17 Claims, 11 Drawing Sheets

(56) References Cited

U.S. PATENT DOCUMENTS

| | | | | |
|---|---|---|---|---|
| 2016/0163193 A1* | 6/2016 | Cross | ................... | G08G 1/082 |
| | | | | 340/907 |
| 2019/0012625 A1* | 1/2019 | Lawrenson | ............ | G07C 5/008 |
| 2019/0178656 A1* | 6/2019 | Stegall | ............. | G08G 1/096822 |
| 2020/0262453 A1* | 8/2020 | Mimura | ................. | G06Q 50/30 |

FOREIGN PATENT DOCUMENTS

| | | |
|---|---|---|
| JP | 2006-277295 A | 10/2006 |
| JP | 2018-116739 A | 7/2018 |
| JP | 2020-52885 A | 4/2020 |
| WO | 2019/009385 A1 | 1/2019 |

* cited by examiner

VEHICLE CONTROL METHOD, VEHICLE CONTROL DEVICE, AND VEHICLE CONTROL SYSTEM

CROSS-REFERENCE TO RELATED APPLICATIONS

This application is a U.S. national stage application of International Application No. PCT/IB2020/000372, filed on Apr. 17, 2020.

BACKGROUND

Technical Field

The present invention relates to a vehicle control method, a vehicle control device, and a vehicle control system.

Background Information

A method for reserving a parking space by a user is known from Japanese Laid-Open Patent Application No. 9-16898 (Patent Document 1). The method disclosed in Patent Document 1 improves the serviceability of parking space reservations by assisting a user's arrival at a parking space reserved by the user.

SUMMARY

However, the method described in Patent Document 1 does not take into consideration the relationship between the order of arrival and the stopping order at the stop location when a plurality of users have made reservations. There is the risk that spatial utilization efficiency will be worse than when the stopping order and the arrival order are the same.

In view of the problem described above, an object of the present invention is to provide a vehicle control method, a vehicle control device, and a vehicle control system that can use a stopping area efficiently.

A vehicle control method according to one aspect of the present invention sets a stopping order of a plurality of vehicles, which indicates a stopping order at a stop location in a stopping area; estimates, based on position information of the plurality of vehicles, an arrival order, which indicates the order in which the plurality of vehicles arrive at a prescribed location; determines whether the estimated arrival order differs from the stopping order; and if it is determined that the arrival order differs from the stopping order, controls the travel of at least one vehicle from among the plurality of vehicles, so that the arrival order becomes the same as the stopping order by the time the plurality of vehicles arrive at the prescribed location.

By means of the present invention, it becomes possible to utilize a stopping area efficiently.

BRIEF DESCRIPTION OF THE DRAWINGS

Referring now to the attached drawings which form a part of this original disclosure.

DETAILED DESCRIPTION OF EMBODIMENTS

Figure 1:
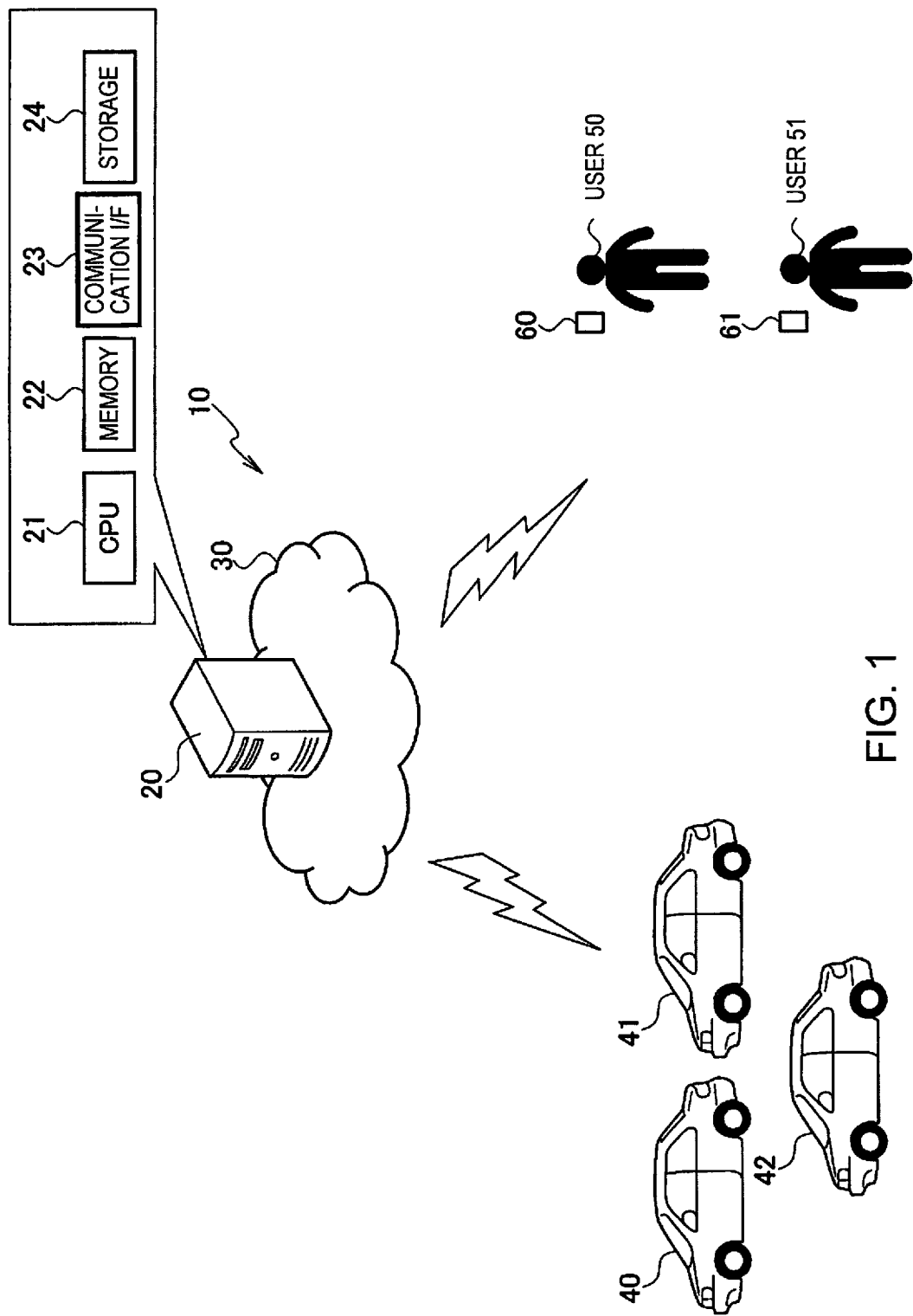
FIG. 1 is an overall schematic diagram of the vehicle control system according to an embodiment of the present invention.

Embodiments of the present invention are described below with reference to the drawings. In the descriptions of the figures, identical parts have been assigned the same reference numerals, and their descriptions have been omitted.

Configuration Example of Vehicle Control System

A configuration example of a vehicle control system 10 according to the present embodiment will be described with reference to FIGS. 1 to 2.

As shown in FIG. 1, the vehicle control system 10 includes a controller 20, a communication network 30, vehicles 40 to 42, a user 50, a terminal device 60 in the possession of the user 50, a user 51, and a terminal device 61 in the possession of the user 51. In FIG. 1, there are three vehicles, but no limitation is implied thereby. The vehicle control system 10 may include four or more vehicles. Moreover, in FIG. 1, there are two users, but there are numerous users who are not shown. The numerous users who are not shown, like the users 50 and 51, also possess terminal devices.

The controller 20 (vehicle control device) communicates with the vehicles 40 to 42 and the terminal devices 60 to 61 via the communication network 30. The controller 20 comprises a CPU (Central Processing Unit) 21, a memory 22, a communication I/F 23, and a storage 24, and these components are electrically connected via a bus, etc., not shown in the figure. Although the installation location of the controller 20 is not particularly limited, the controller 20 is installed, for example, in a business that operates the vehicles 40 to 42.

The CPU 21 loads various programs stored in the storage 24, etc., into the memory 22, and executes various instructions contained in the programs. The memory 22 is a storage medium such as a ROM (Read Only Memory), RAM (Random Access Memory), etc. The storage 24 is a storage medium such as an HDD (Hard Disk Drive). Some (or all) of the vehicle control system 10, including the functions of the controller 20, described below, may be provided by means of an application (Software as a Service (SaaS), etc.) located on the communication network 30. The controller 20 may be a server.

The communication I/F 23 is implemented as hardware, such as a network adapter, various types of communication software, or a combination thereof, and is configured to realize wired or wireless communication via the communication network 30, etc.

The communication network 30 may be configured by a wireless and/or wired method, and the communication network 30 may include the Internet. In this embodiment, the controller 20, the vehicles 40 to 42, and the terminal devices 60 to 61 are connected to the communication network 30 by means of a wireless communication method.

In this embodiment, the vehicles 40 to 42 are described as autonomous driving vehicles without a driver. The vehicles 40 to 42 are, for example, taxis, although the vehicles are not limited to taxis. Therefore, the vehicles 40 to 42 may be described as robot taxis or unmanned taxis. The vehicles 40 to 42 are also not limited to autonomous driving vehicles and may be ordinary vehicles without an autonomous driving function. Alternatively, the vehicles 40 to 42 may be vehicles that can switch between autonomous driving and manual driving.

If the use of private cars as taxis is permitted by law (and even if it is not permitted by current law, but will be permitted in the future after a revision of the law), the vehicles 40 to 42 may be private cars.

The user 50 requests (reserves) a vehicle using the terminal device 60. A vehicle dispatch application (hereinafter referred to simply as a vehicle dispatch app) used for reserving vehicles is installed in the terminal device 60, and the user 50 requests a vehicle using the vehicle dispatch app. The user 51 also requests a vehicle using the terminal device 61. This type of vehicle request may be referred to as a vehicle dispatch request.

Next, with reference to FIG. 2, details of the controller 20, the vehicle 40, and the terminal device 60 will be described. Although the vehicles 41-42 and the terminal device 61 have been omitted from FIG. 2, the vehicles 41-42 have the same configuration as the vehicle 40, and the terminal device 61 has the same configuration as the terminal device 60.

The terminal device 60 comprises a communication I/F 601 and a vehicle dispatch app 602. The communication I/F 601 has the same configuration as the communication I/F 23 and communicates with the controller 20 via the communication network 30. The terminal device 60 is, for example, a smartphone, a tablet, or the like. Further, the terminal device 60 may also be a wearable device. The terminal device 61 (not shown) includes a vehicle dispatch app 603 (not shown).

The vehicle dispatch app 602 is used for requesting a vehicle, as described above. The vehicle dispatch app 602 functions as a user interface when the user 50 requests a vehicle. The vehicle dispatch app 602 is realized by the CPU provided in the terminal device 60 reading and executing a dedicated application program from a storage provided in the terminal device 60. When the user 50 requests a vehicle, the user 50 inputs a desired boarding location, boarding time, deboarding location, etc., into the vehicle dispatch app 602 to request the vehicle. The vehicle dispatch app 602 transmits a dispatch request to the controller 20 in accordance with the input from the user 50. Further, the terminal device 60 displays on a display provided in the terminal device 60 various types of information (dispatch request receipt, scheduled arrival time, scheduled travel route, etc.) included in the signal returned from the controller 20 in response to the dispatch request. However, the method of realizing the vehicle dispatch app 602 is not limited in this way. For example, the terminal device 60 may access a server that provides the functions of the vehicle dispatch app 602, receive the functions provided, and display the results of executing the functions transmitted from the server in a browser.

Figure 2:
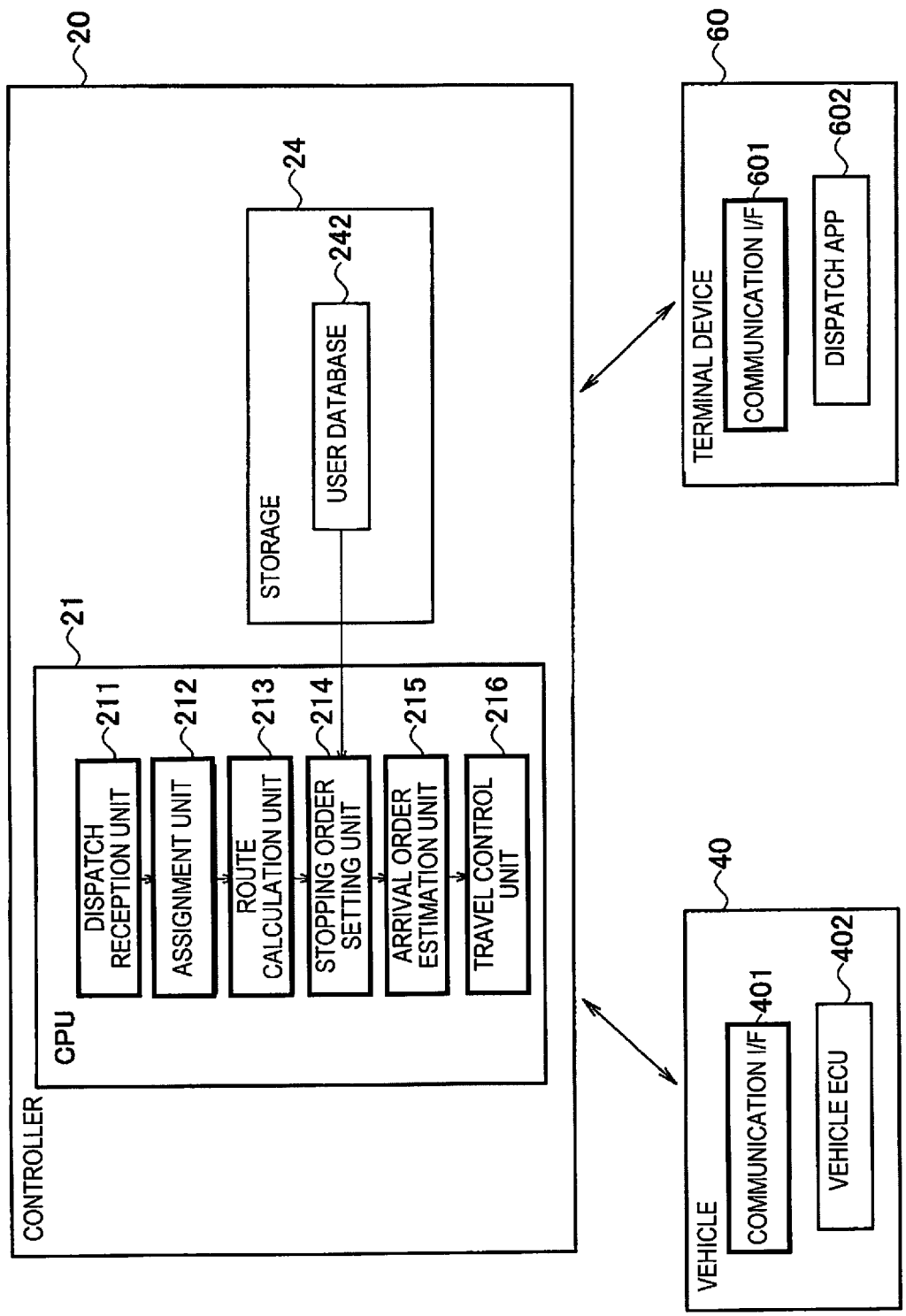
FIG. 2 is a functional block diagram of a controller, a vehicle, and a terminal device according to the embodiment of the present invention.

As shown in the block diagram of FIG. 2, the CPU 21 of the controller 20 is provided with, as examples of a plurality of functions, a vehicle dispatch acceptance unit 211, an assignment unit 212, a route calculation unit 213, a stopping order setting unit 214, an arrival order estimation unit 215, and a travel control unit 216. As shown in the block diagram of FIG. 2, a user database 242 is stored in the storage 24 of the controller 20.

The vehicle dispatch acceptance unit 211 accepts a request from the user 50 via the terminal device 60. Further, the vehicle dispatch acceptance unit 211 has the function of notifying the terminal device 60 of the acceptance of the request from the user 50, as well as of the scheduled arrival time to the boarding location, the scheduled travel route to the boarding location, etc. Further, the vehicle dispatch acceptance unit 211 accepts a request from the user 51 via the terminal device 61.

The assignment unit 212 assigns a suitable vehicle from among the plurality of vehicles 40 to 42 based on the accepted dispatch request. For example, for reasons of efficiency, the assignment unit 212 can assign the unoccupied vehicle 40 that, of the plurality of vehicles 40 to 42, is closest to the boarding location desired by the user 50. Further, if the user 50 has specified a vehicle type, the assignment unit 212 assigns the specified vehicle type. GPS receivers are installed in the vehicles 40 to 42, and the location information of the vehicles 40 to 42 is transmitted to the controller 20 at any given time.

The route calculation unit 213 calculates a route from the current location of the vehicle 40 to the boarding location desired by the user 50 and sends an instruction to the vehicle 40 to travel to the boarding location desired by the user 50 via the calculated route. The route calculated by the route calculation unit 213 is, for example, the route via which the boarding location desired by the user 50 can be reached from the current location of the vehicle 40 in the shortest amount of time.

The stopping order setting unit 214 sets a stopping order, which indicates the order in which a plurality of vehicles are to stop at the boarding location. As an example, the boarding locations of the vehicles 40, 41 reserved by the users 50, 51, respectively, may be the same. In this case, the stopping order setting unit 214 sets the stopping order, which indicates the order in which the plurality of vehicles 40, 41 are to stop at the boarding location.

The arrival order estimation unit 215 acquires the position information of the vehicles 40, 41 and estimates, based on the acquired position information, the arrival order, which indicates the order in which the vehicles 40, 41 will arrive at the prescribed location. The arrival order estimation unit 215 transmits a signal indicating the estimated arrival order to the travel control unit 216.

The travel control unit 216 receives the signal indicating the arrival order and determines whether the arrival order differs from the stopping order. If it is determined that the arrival order differs from the stopping order, the travel control unit 216 controls the travel of the vehicles 40, 41 such that by the time the vehicles 40, 41 arrive at the prescribed location, the arrival order will be the same as the stopping order. Specifically, the travel control unit 216 outputs a command to the vehicles 40, 41 to make the arrival order and the stopping order the same.

The vehicle 40 is equipped with a communication I/F 401 and a vehicle ECU (Electronic Control Unit) 402. The communication I/F 401 has the same configuration as the communication I/F 23 and the communication I/F 601, and communicates with the controller 20 via the communication network 30. The vehicle ECU 402 is a computer for controlling the vehicle 40. The vehicle ECU 402 controls various actuators (brake actuator, accelerator pedal actuator, steering actuator, etc.) based on the commands from the controller 20.

In this embodiment, a stop means a temporary stop to allow the user to board and deboard a vehicle.

Next, details of the functions of the stopping order setting unit 214, the arrival order estimation unit 215, and the travel control unit 216 will be described with reference to FIGS. 3 to 7.

Figure 3:
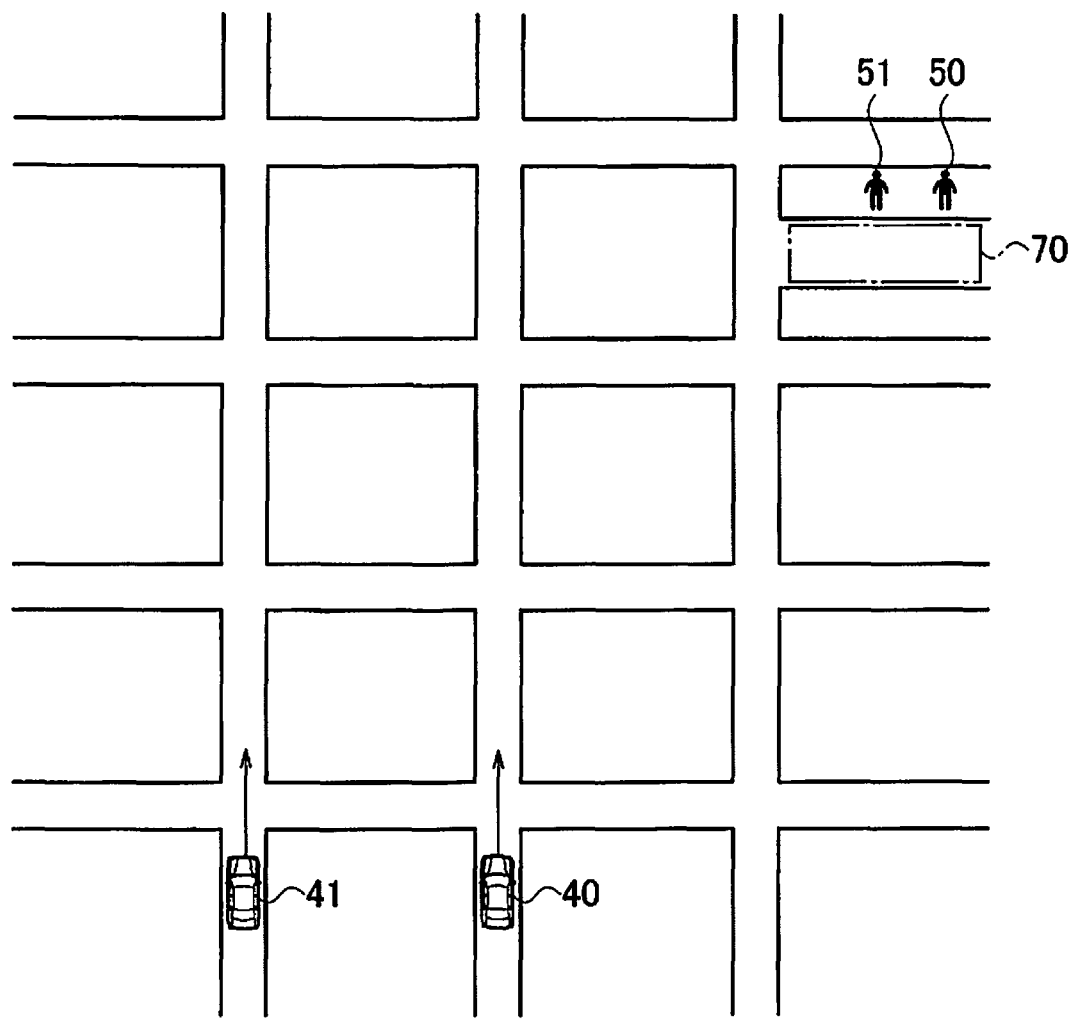
FIG. 3 is a diagram describing an example of the method for setting a stopping order according to the embodiment of the present invention.

The scenario shown in FIG. 3 is one in which the users 50, 51 have reserved vehicles using the vehicle dispatch app and are waiting for the vehicles. Here, the reservation time specified by the user 50 is 10:00, and the boarding location specified by the user 50 is stopping area 70. Further, the reservation time specified by the user 51 is 10:05, and the boarding location specified by the user 51 is the stopping area 70. The stopping area 70 is a boarding/deboarding location where a plurality of vehicles can stop, such as a roundabout in front of a train station, a taxi zone at an airport, etc.

In FIG. 3, the vehicle assigned to the user 50 is the vehicle 40. Further, the vehicle assigned to the user 51 is the vehicle 41. The vehicles 40, 41 receive a command from the controller 20 and travel toward the stopping area 70 based on the received command. The stopping order setting unit 214 refers to the reservation information of the users 50, 51 and sets the stopping order, which indicates the order in which the vehicles 40, 41 will stop at the stopping area 70. The reservation information includes the reservation times. The reservation information of the users 50, 51 is stored in the user database 242, for example, so that the stopping order setting unit 214 can refer to the user database 242 in order to acquire the reservation information of the users 50, 51. As described above, the reservation time of the user 50 is 10:00 and the reservation time of the user 51 is 10:05. The stopping order setting unit 214 refers to the reservation information of the users 50, 51 and sets the stopping order of the vehicle 40 to 1st and the stopping order of the vehicle 41 to 2nd. The scenario shown in FIG. 4 is one in which, starting with the scenario shown in FIG. 3, the vehicle 40 arrives at the stopping area 70 before the vehicle 41, and the vehicles 40, 41 stop in accordance with the set stopping order.

Figure 4:
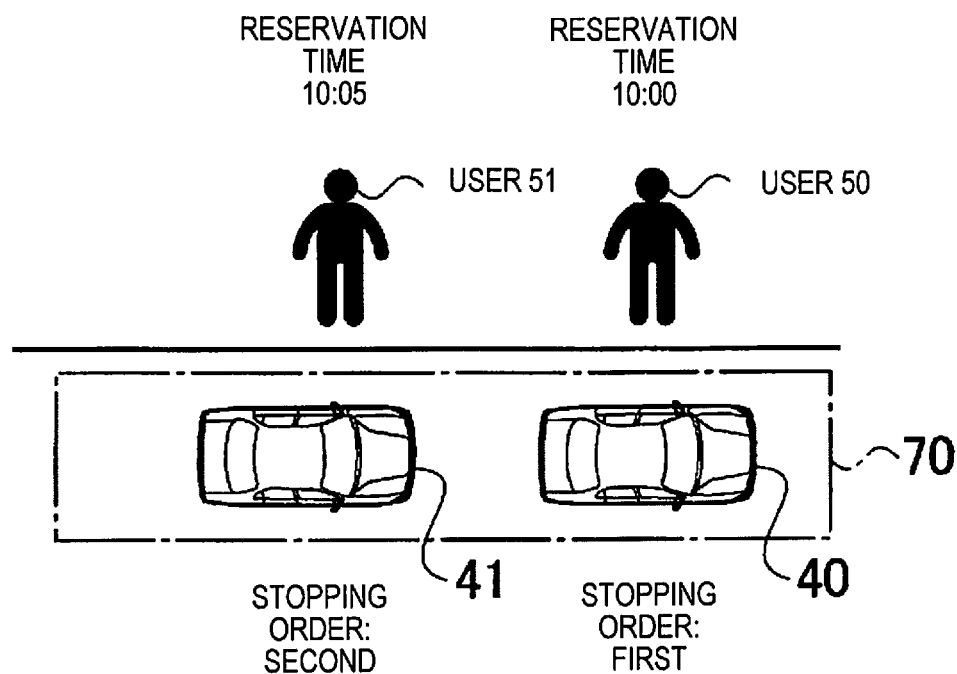
FIG. 4 is a diagram describing an example of the method for setting the stopping order according to the embodiment of the present invention.

In FIG. 4, it is explained that the vehicle 40 arrives at the stopping area 70 ahead of the vehicle 41, but the reverse could also occur. That is, the vehicle 41 may arrive at the stopping area 70 ahead of the vehicle 40. In this case, the vehicles stop in the order of the vehicle 40 followed by the vehicle 41, but arrive in the order of the vehicle 41 followed by the vehicle 40. That is, the arrival order differs from the stopping order.

Figure 5:
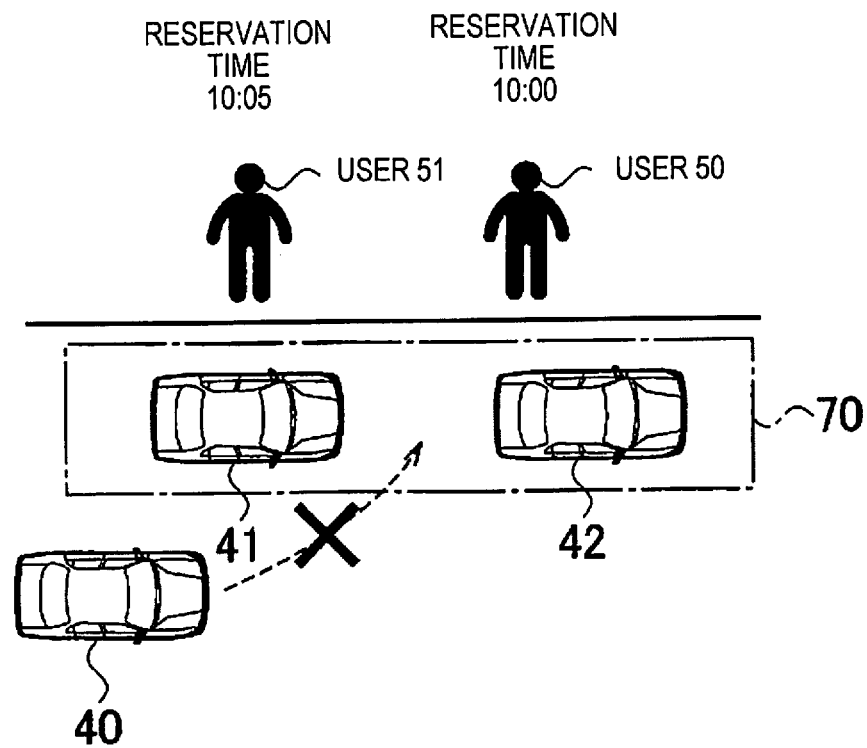
FIG. 5 is a diagram describing a case in which the stopping order and an order of arrival are different.

A case in which the stopping order and the arrival order differ is described with reference to FIG. 5. In FIG. 5, the stopping order is the vehicle 40, and then the vehicle 41, but the arrival order is the vehicle 41, and then the vehicle 40. FIG. 5 also shows a vehicle 42 which is different from the vehicles 40, 41. The vehicle 42 is described as already having stopped in the stopping area 70 before the arrival of the vehicle 41 at the stopping area 70. In other words, the vehicle 42 is not a vehicle that affects the order in which the vehicles 40, 41 arrive and stop. Further, the vehicle 42 is not a vehicle reserved by the users 50, 51.

In FIG. 5, because the vehicle 42 has stopped in the stopping area 70 before the arrival of the vehicle 41, upon arrival at the stopping area 70, the vehicle 41 will stop in a position behind the vehicle 42. As shown in FIG. 5, because the vehicle 40 arrives at the stopping area 70 after the vehicle 41, if there is a short distance between the vehicle 42 and the vehicle 41, there is the risk that it will take longer for the vehicle 40 to stop between the vehicle 42 and the vehicle 41. Alternatively, it may be difficult for the vehicle 40 to stop between the vehicle 42 and the vehicle 41. If the arrival order differs from the stopping order in this manner, there is the risk that the stopping area 70 cannot be used efficiently. In FIG. 5, the purpose of the vehicle 40 stopping between the vehicle 42 and the vehicle 41 is to support a smooth departure of the vehicles by making the departure order the same as the users' reserved boarding order.

In FIG. 5, because the stopping order is the vehicle 40, the vehicle 41, the above-described problem can be solved if the vehicle 40 arrives at the stopping area 70 ahead of the vehicle 41. That is, if the arrival order and the stopping order are the same, the vehicle 40 will stop behind the vehicle 42, and the vehicle 41 will then stop behind the vehicle 40, thereby solving the above-described problem. Thus, the arrival order estimation unit 215 acquires the position information of the vehicles 40, 41, and estimates, based on the acquired position information, the arrival order, which indicates the order in which the vehicles 40, 41 will arrive at the prescribed location. The arrival order estimation unit 215 transmits a signal indicating the estimated arrival order to the travel control unit 216. The travel control unit 216, which has received the signal indicating the arrival order, determines whether the arrival order differs from the stopping order. Then, if it is determined that the arrival order differs from the stopping order, the travel control unit 216 controls the travel of the vehicles 40, 41 such that the arrival order becomes the same as the stopping order by the time the vehicles 40, 41 arrive at the prescribed location. The problem described above is thereby solved, and realizes the efficient use of the stopping area 70. A specific example will be described with reference to FIG. 6.

Figure 6:
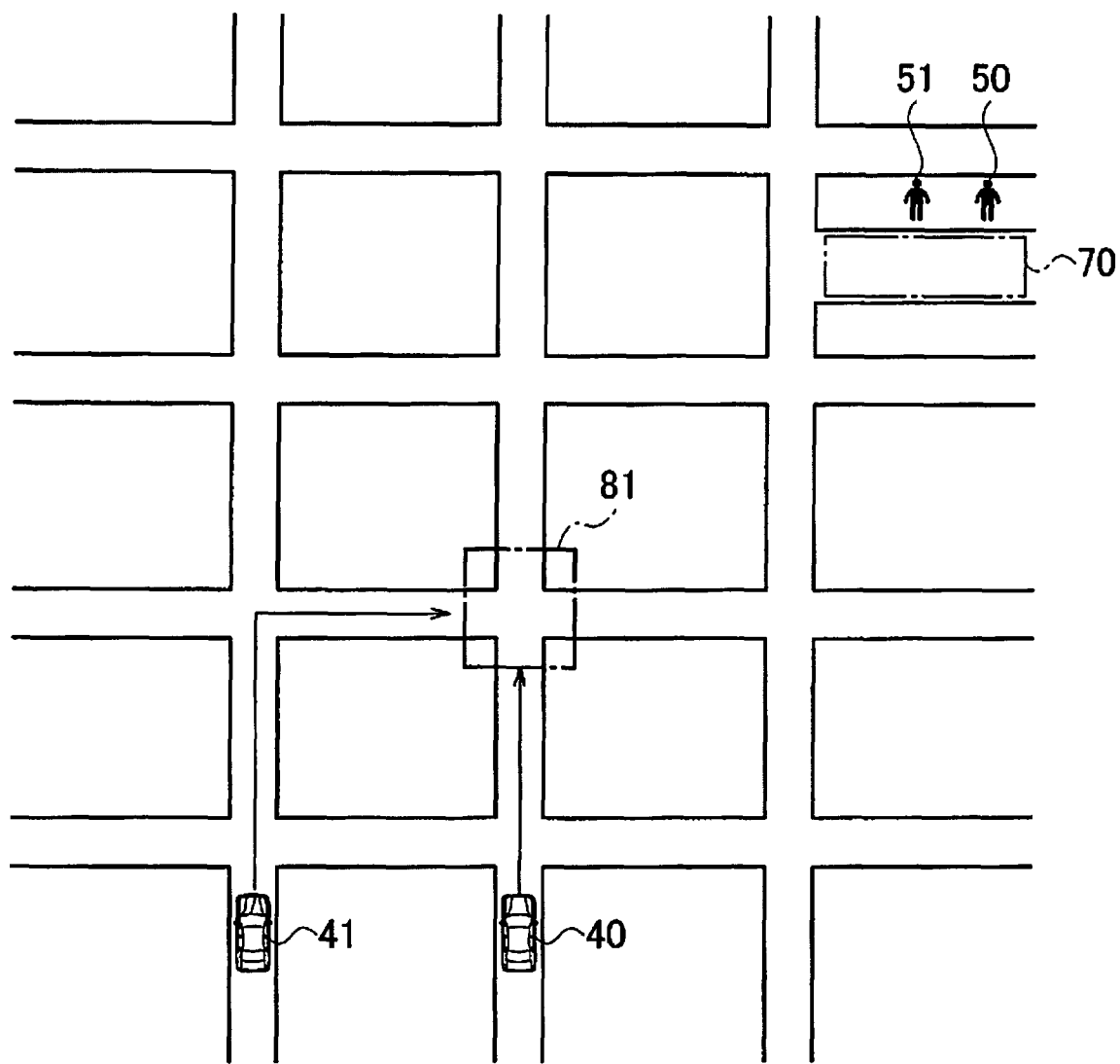
FIG. 6 is a diagram describing an example of the vehicle control method according to the embodiment of the present invention.

The arrival order estimation unit 215 first acquires the position information of the vehicles 40, 41 shown in FIG. 6. As described above, the position information of the vehicles 40, 41 is transmitted from the vehicles 40, 41 to the arrival order estimation unit 215. The arrival order estimation unit 215 estimates, based on the acquired position information, the arrival order, which indicates the order in which the vehicles 40, 41 will arrive at the prescribed location. Here, the prescribed location is, for example, the intersection 81 shown in FIG. 6. The intersection 81 is an intersection through which both the vehicles 40, 41 will pass as the vehicles 40, 41 travel toward the stopping area 70. The route to the intersection 81 is calculated by the route calculation unit 213. Thus, the arrival order estimation unit 215 can use the position information of the vehicles 40, 41 in order to estimate the arrival times at which the vehicles 40, 41 will arrive at the intersection 81. The arrival order estimation unit 215 can arrange the estimated times of arrival in chronological order to estimate the order of arrival at the intersection 81. The arrival order estimation unit 215 outputs a signal indicating the arrival order to the travel control unit 216. To improve the estimation accuracy of the order of arrival, the estimation unit 215 may acquire the speeds of the vehicles 40, 41, combine the speeds with the position information, and then estimate the order of arrival. The prescribed location is not limited to the intersection 81. The prescribed location may be the stopping area 70.

The travel control unit 216, which has received the signal indicating the arrival order, determines whether the arrival order differs from the stopping order. The stopping order in FIG. 6, as in FIG. 4, is the vehicle 40, followed by the vehicle 41. On the other hand, the order of arrival at the intersection 81 is the vehicle 41, followed by the vehicle 40. In this case, the travel control unit 216 determines that the arrival order differs from the stopping order. If the vehicles 40, 41 continue to travel in this way, the vehicle 41 will likely arrive at the stopping area 70 first. Thus, if it is determined that the arrival order differ from the stopping order, the travel control unit 216 controls the travel of the vehicles 40, 41 such that their order of arrival at the intersection 81 will be the same as their stopping order by the time the vehicles 40, 41 arrive at the intersection 81.

There are two possible ways to ensure that the order of arrival at the intersection 81 is the same as the stopping order. One is to have the vehicle 40 arrive at the intersection 81 earlier. The other is have the vehicle 41 arrive at the intersection 81 later.

First, the method of making the vehicle 40 arrive at the intersection 81 earlier will be described. There are several possible ways to have the vehicle 40 arrive at the intersection 81 earlier. For example, the travel control unit 216 may output a command to the vehicle 40 to change to a lane with a faster flow of traffic. This can be realized by acquiring the speed of the flow of traffic for each lane of the road on which the vehicle 40 is traveling. By causing the vehicle 40 to change to a lane with a faster flow of traffic, the vehicle 40 can arrive at the intersection 81 earlier.

Although different from FIG. 6, the travel control unit 216 may output a command to the vehicle 40 to change from the current route to a route with an earlier time of arrival at the intersection 81. This can be realized by the route calculation unit 213 calculating a plurality of routes via which the vehicle 40 may arrive at the intersection 81. By causing the vehicle 40 to change from the current route to a route with an earlier time of arrival at the intersection 81, the vehicle 40 can arrive at the intersection 81 earlier.

The travel control unit 216 may execute a plurality of controls to cause the vehicle 40 to arrive at the intersection 81 earlier. The plurality of controls includes, for example, combining the lane change to a lane with a faster flow of traffic, as described above, with the route change to a route with an earlier time of arrival at the intersection 81.

Next, the method of making the vehicle 41 arrive at the intersection 81 later will be described. There are several possible ways to have the vehicle 41 arrive at the intersection 81 later. For example, the travel control unit 216 may output a command to the vehicle 41 to change to a lane with a slower flow of traffic. This can be realized by acquiring the speed of the flow of traffic for each lane of the road on which the vehicle 41 is traveling. By causing the vehicle 41 to change to a lane with a slower flow of traffic, the vehicle 41 can arrive at the intersection 81 later.

Further, the travel control unit 216 may output a command to the vehicle 41 to change from the current route to a route with a later time of arrival at the intersection 81. This can be realized by the route calculation unit 81 calculating a plurality of routes via which the vehicle 213 may arrive at the intersection 41. By causing the vehicle 41 to change from the current route to a route with a later time of arrival time at the intersection 81, the vehicle 41 can arrive at the intersection 81 later.

The travel control unit 216 may execute a plurality of controls to cause the vehicle 41 to arrive at the intersection 81 later. The plurality of controls includes, for example, combining the lane change to a lane with a slower flow of traffic, as described above, with the route change to a route with a later time of arrival at the intersection 81.

The travel control unit 216 may execute either the travel control for causing the vehicle 40 to arrive at the intersection 81 earlier or the travel control for causing the vehicle 41 to arrive at the intersection 81 later, or execute both at the same time.

In this manner, if it is determined that the order of arrival at the intersection 81 differs from the stopping order, the travel control unit 216 controls the travel of the vehicles 40, 41 such that the order of arrival at the intersection 81 will be the same as the stopping order by the time the vehicles 40, 41 arrive at the intersection 81. Making the order of arrival at the intersection 81 the same as the stopping order increases the likelihood that the order of arrival at the stopping area 70 will be the same as the stopping order. Thus, the efficient use of the stopping area 70 can be realized.

Figure 7:
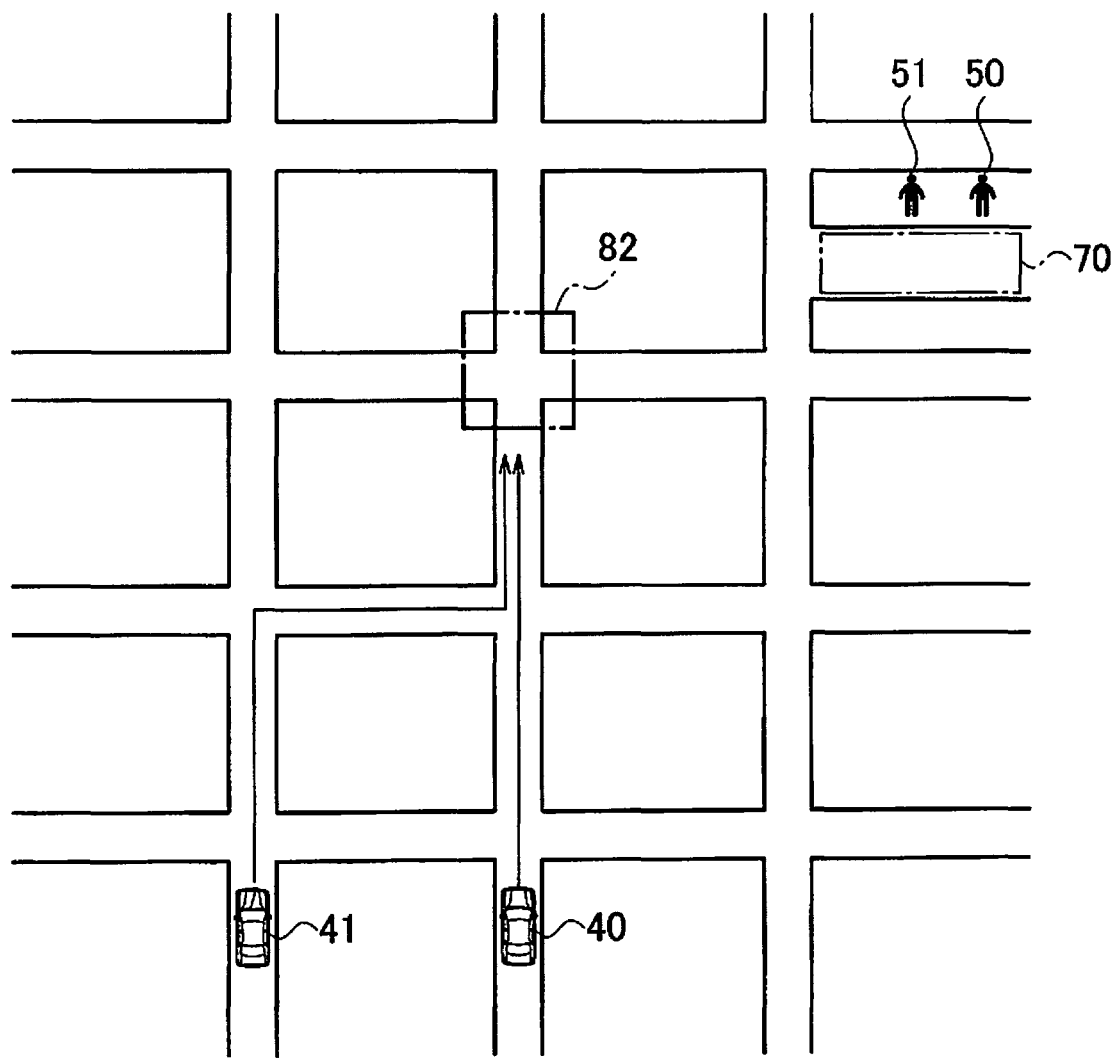
FIG. 7 is a diagram describing another example of the vehicle control method according to the embodiment of the present invention.

Despite the control of the travel of the vehicles 40, 41, it is possible that, depending on road conditions, the vehicle 41 will arrive at the intersection 81 before the vehicle 40. In this case, the arrival order estimation unit 215 may estimate, based on the position information of the vehicles 40, 41, the arrival order, which indicates the order in which the vehicles 40, 41 arrive at the intersection 82 shown in FIG. 7, which is the next intersection. In FIG. 7, the intersection 82 is the next intersection after the intersection 81, but is not limited to this intersection. The intersection 82 may be any intersection between the intersection 81 and the stopping area 70 through which both the vehicles 40, 41 pass.

If the order in which the vehicles 40, 41 will arrive at the intersection 82 is then determined to be different from the stopping order, the travel control unit 216 controls the travel of the vehicles 40, 41 such that the order of arrival at the intersection 81 will be the same as the stopping order by the time the vehicles 40, 41 arrive at the intersection 81. This travel control is the same as that described above. Repeatedly controlling the travel of the vehicles 40, 41 in this manner until the arrival order at the prescribed location (intersections 81, 82) is the same as the stopping order increases the likelihood that the arrival order will be the same as the stopping order.

Figure 8:
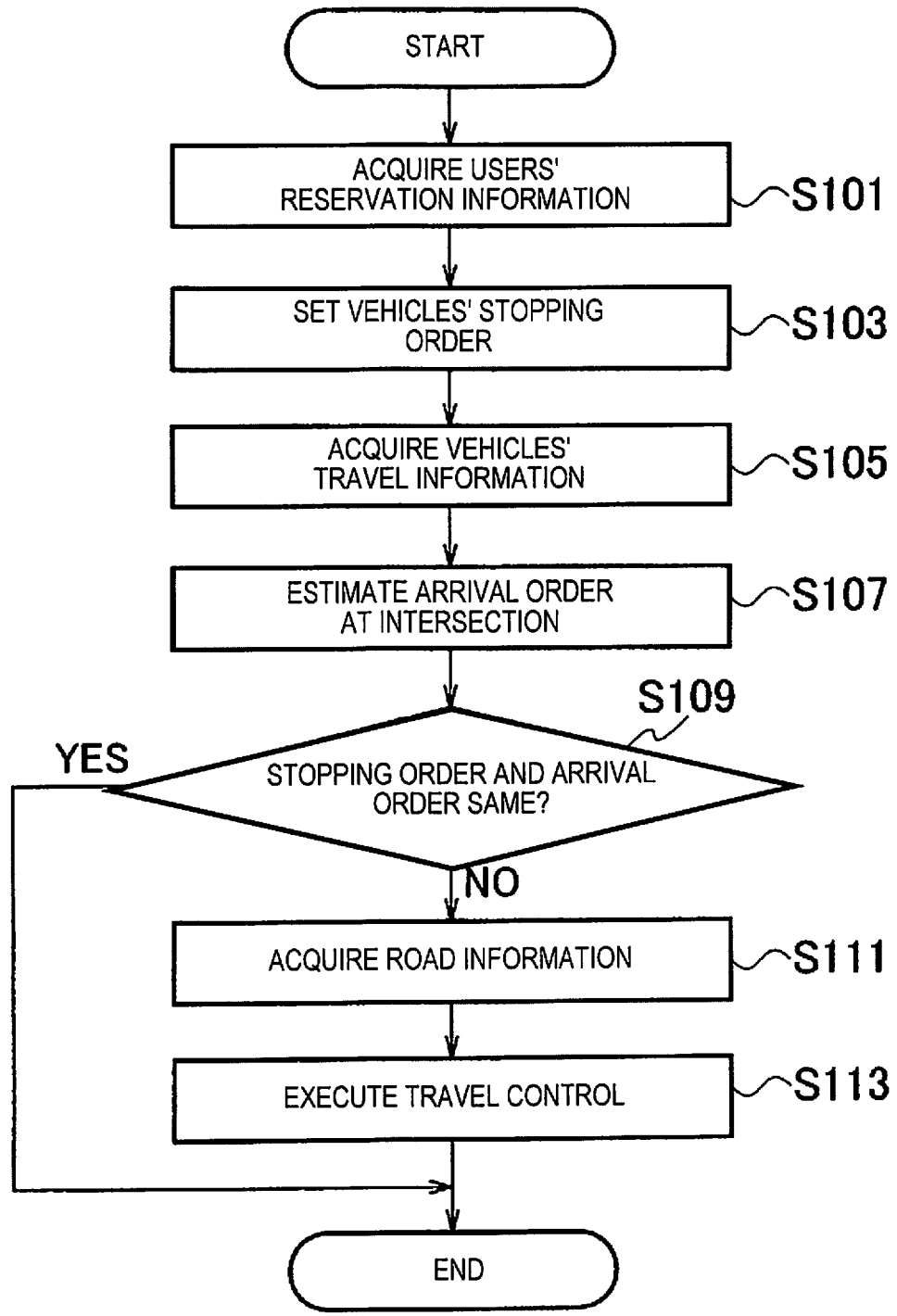
FIG. 8 is a flowchart describing an operation example of a controller according to the embodiment of the present invention.

An operation example of the controller 20 will be now described with reference to the flow chart of FIG. 8.

In Step S101, the stopping order setting unit 214 refers to the user database 242 and acquires the reservation information of the users 50, 51. The process then proceeds to Step S103, in which the stopping order setting unit 214 sets the stopping order, which indicates the order in which the vehicles 40, 41 are to stop at the stopping area 70 based on the acquired reservation information (refer to FIG. 4).

The process then proceeds to Step S105, in which the arrival order estimation unit 215 acquires travel information of the vehicles 40, 41. The travel information of the vehicles

40, 41 includes position information, speed information, etc., of the vehicles 40, 41. The process then proceeds to Step S107, in which the arrival order estimation unit 215 estimates, based on the acquired travel information, the arrival order, which indicates the order in which the vehicles 40, 41 will arrive at the intersection 81 (refer to FIG. 6). The arrival order estimation unit 215 transmits a signal indicating the estimated arrival order to the travel control unit 216.

Upon receiving the signal indicating the arrival order, the travel control unit 216 determines whether the arrival order differs from the stopping order. If the arrival order is the same as the stopping order (YES in Step S109), the series of processes is terminated. On the other hand, if the arrival order differs from the stopping order (NO in Step S109), the process proceeds to Step S111, in which the travel control unit 216 acquires road information in order to match the arrival order to the stopping order. Route information includes the speed of the flow of traffic for each lane of the road on which the vehicles 40, 41 travel, the plurality of routes to the intersection 81, and the like.

The process proceeds to Step S113, in which, based on the acquired road information, the travel control unit 216 controls the travel of the vehicles 40, 41 such that, by the time the vehicles 40, 41 arrive at the intersection 81, the order of arrival at the intersection 81 is the same as the stopping order. Making the order of arrival at the intersection 81 the same as the stopping order increases the likelihood that the order of arrival at the stopping area 70 will be the same as the stopping order. Thus, the efficient use of the stopping area 70 can be realized.

Modified Example

A modified example will now be described with reference to FIG. 9.

In the description above, it is explained that the stopping order setting unit 214 refers to the reservation information of the users 50, 51 and sets the stopping order in which the vehicles 40, 41 are to stop at the stopping area 70, but no limitation is implied thereby. The reservation times may be the same, and, depending on the user, the user may arrive at the stopping area 70 later than the reservation time, or arrive at the stopping area 70 earlier than the reservation time. Thus, the stopping order setting unit 214 may also use, in addition to the reservation times, the position information of the users 50, 51 in order to set the stopping order. A specific example will be described with reference to FIG. 9. In FIG. 9, the reservation time specified by the user 50 is 10:00, and the reservation time specified by the user 51 is also 10:00. The stopping order setting unit 214 may also use, instead of the reservation times, the position information of the users 50, 51 to set the stopping order.

The position information of the users 50, 51 is transmitted from the terminal devices 60, 61 in possession of the users 50, 51 to the stopping order setting unit 214. The position information of the terminal devices 60, 61 in possession of the users 50, 51 can be regarded as the position information of the users 50, 51. The stopping order setting unit 214 refers to the user database 242 in order to acquire the movement speeds (walking speeds) of the users 50, 51. The obtained position information of the users 50, 51 and walking speeds of the users 50, 51 can be combined to obtain the times at which the users 50, 51 will arrive at the stopping area 70. The stopping order setting unit 214 may set the order of the times at which the users 50, 51 will arrive at the stopping area 70 as the stopping order.

Figure 9:
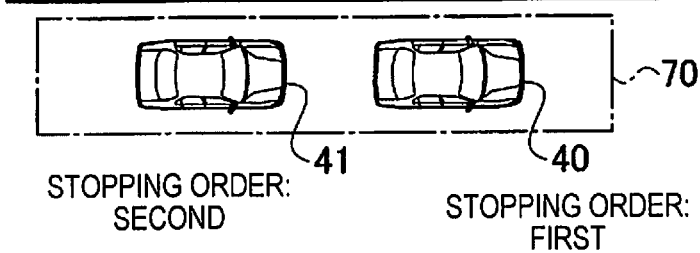
FIG. 9 is a diagram describing an example of the method for setting the stopping order according to a modified example of the present invention.

In the case that the user 50 will arrive at the stopping area 70 before the user 51, the stopping order is set in the order of the vehicle 40, the vehicle 41, as shown in FIG. 9. In this manner, the stopping order setting unit 214 can also use, in addition to the reservation times, the position information of the users 50, 51 to set the stopping order in order to set a stopping order that is more convenient for the users 50, 51.

Figure 10:
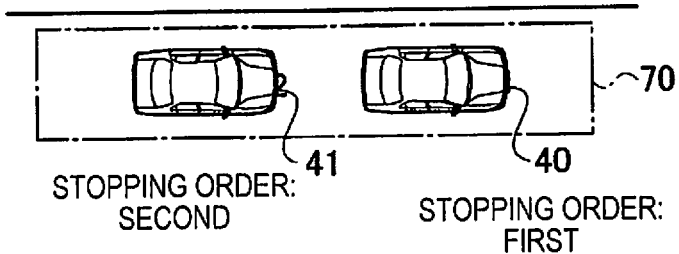
FIG. 10 is a diagram describing another example of a method for setting the stopping order according to a modified example of the present invention.

As shown in FIG. 10, if the reservation time specified by the user 50 is 10:05, and the reservation time specified by the user 51 is 10:00, the stopping order would be set to the vehicle 41, and then the vehicle 40 if one were to take only the reservation times into account. However, as described above, depending on the user, the user may arrive at the stopping area 70 later than the reservation time, or arrive at the stopping area 70 earlier than the reservation time. There is the possibility that the user 51, whose reservation time is earlier, will arrive at the stopping area 70 after the user 50. Thus, based on the position information of the users 50, 51, the user 50 may be calculated to arrive at the stopping area 70 before the user 51. In this case, as shown in FIG. 10, the stopping order is set in the order of the vehicle 40, and then the vehicle 41. In this manner, in addition to the reservation times, the stopping order setting unit 214 can also use the position information of the users 50, 51 to set the stopping order in order to set a stopping order that is more convenient for the users 50, 51.

Further, the travel control unit 216 may use the time that the vehicle 41 is to be met to control the travel of the vehicle 41. Such a meeting time of the vehicle 41 is the reservation time specified by the user 51. If the reservation time is 10:00, the meeting time is also 10:00. Further, if the reservation time is a range of times, such as between 10:00 to 10:10, the meeting time also becomes 10:00 to 10:10.

As described in FIG. 6, if the arrival order differs from the stopping order, travel control to cause the vehicle 41 to arrive at the intersection 81 later could be considered. However, there is the possibility that controlling the travel of the vehicle 41 may result in the vehicle 41 arriving after the meeting time. Thus, the travel control unit 216 calculates a travel control plan for causing the vehicle 41 to arrive at the intersection 81 later. This travel control plan includes causing the vehicle 41 to change to a lane with a slower flow of traffic, to travel on a route with a later arrival time to the intersection 81, etc. In other words, the travel control plan in this embodiment includes a plurality of controls.

The travel control unit 216 estimates the time at which the vehicle 41 will arrive at the stopping area 70 for the case in which the vehicle 41, which is later in the order of arrival, is controlled to arrive at the intersection 81 later in accordance with the travel control plan. That is, the travel control unit 216 estimates the time at which the vehicle 41, which is later in the order of arrival, will arrive at the stopping area 70 due to executing travel control of the vehicle 41. If the estimated arrival time is later than the meeting time, the travel control unit 216 prohibits the control of the vehicle 41 that is later in the stopping order. Thus, the order of arrival at the intersection 81 can be made the same as the stopping order by means of travel control of the vehicle 40, which is earlier in the stopping order, and the vehicle 41 can be prevented from not arriving by the meeting time.

Further, the travel control unit 216 may use a waitable time of the vehicle 40 in order to control the travel of the vehicle 40. The waitable time of the vehicle 40 is the amount of time that the vehicle 40 can wait for the user 50 after arriving at the stopping area 70. As an example, the waitable time is five minutes. That is to say, if the user 50 has not boarded the vehicle 40 within five minutes of its arrival at the stopping area 70, the vehicle 40 may depart the stopping area 70. The waitable time of the vehicle 40 is stored in the storage 24, for example. Therefore, the travel control unit 216 can refer to the storage 24 in order to acquire the waitable time of the vehicle 40. The waitable time of the vehicle 40 may be stored in a storage device installed in the vehicle 40. If the waitable time of the vehicle 40 is stored in a storage device installed in the vehicle 40, the travel control unit 216 can acquire the waitable time of the vehicle 40 from the vehicle 40.

As described in FIG. 6, if the arrival order differs from the stopping order, travel control to make the vehicle 40 arrive at the intersection 81 earlier could be considered. However, there is a possibility that controlling the travel of the vehicle 40 will result in the vehicle 40 arriving at the stopping area 70 before the reservation time. Thus, the travel control unit 216 calculates a travel control plan for causing the vehicle 40 to arrive at the intersection 81 earlier. This travel control plan includes causing the vehicle 40 to change to a lane with a faster flow of traffic, to travel on a route with an earlier arrival time at the intersection 81, etc. That is, the travel control plan for causing the vehicle 40 to arrive at the intersection 81 earlier also includes a plurality of controls.

The travel control unit 216 estimates the time at which the vehicle 40 will arrive at the stopping area 70, for the case in which the vehicle 40, which is earlier in the stopping order, is controlled to arrive at the intersection 81 earlier in accordance with the travel control plan. That is, the travel control unit 216 estimates the time at which the vehicle 40, which is earlier in the stopping order, will arrive at the stopping area 70, due to executing travel control of the vehicle 40. The travel control unit 216 determines whether the user 50 will arrive at the stopping area 70 after the waitable time since the vehicle arrival time has elapsed. The time at which the user 50 arrives at the stopping area 70 can be obtained by the method described above. If it is determined that the user 50 will arrive at the stopping area 70 after the waitable time has elapsed, the travel control unit 216 prohibits control of the vehicle 40 which is earlier in the stopping order. Thus, the order of arrival at the intersection 81 can be made the same as the stopping order by travel control of the vehicle 41, which is later in the order of arrival, and the vehicle 40 can be prevented from departing without boarding the user 50.

Next, an operation example of the controller 20 according to a modified example will be described with reference to the flowchart of FIG. 11.

In Step S201, the stopping order setting unit 214 acquires position information from the terminal devices 60, 61 in the possession of the users 50, 51. The position information of the terminal devices 60, 61 can be regarded as the position information of the users 50, 51. The process proceeds to Step S203, in which the stopping order setting unit 214 refers to the user database 242 and acquires the walking speeds of the users 50, 51. The stopping order setting unit 214 uses the position information of the users 50, 51 and the walking speeds of the users 50, 51 to estimate the times at which the users 50, 51 will arrive at the stopping area 70.

The process proceeds to Step S205, and the stopping order setting unit 214 sets the order of the times at which the users 50, 51 will arrive at the stopping area 70 as the stopping order. The processes of Steps S209, 211, and 213 are the same as the processes of Steps S107, 109, and 111 of FIG. 8, and their descriptions will be omitted.

The process proceeds to Step S215, and the travel control unit 216 calculates a travel control plan for causing the vehicle 41 to arrive at the intersection 81 later. The travel control plan includes a plurality of controls, as described above. The process proceeds to Step S217, in which the travel control unit 216 estimates the time at which the vehicle 41 will arrive at the stopping area 70 when the travel of the vehicle 41 is controlled in accordance with the travel control plan.

The process proceeds to Step S219, in which the travel control unit 216 refers to the user database 242 in order to acquire the meeting time of the vehicle 41. If the arrival time is later than the meeting time (YES in Step S221), that is, if the vehicle 41 will arrive after the meeting time due to executing a plurality of controls, the travel control unit 216 prohibits control of the vehicle 41 (Step S223). Thus, the order of arrival at the intersection 81 can be made the same as the stopping order, and the vehicle 41 can be prevented from arriving after the meeting time.

On the other hand, if the arrival time is not later than the meeting time (NO in Step S221), the travel control unit 216 executes the plurality of controls (Step S225). Thus, the order of arrival at the intersection 81 can be made the same as the stopping order, which increases the likelihood that the order of arrival at the stopping area 70 will be the same as the stopping order. Thus, the efficient use of the stopping area 70 can be realized.

Figure 12A:
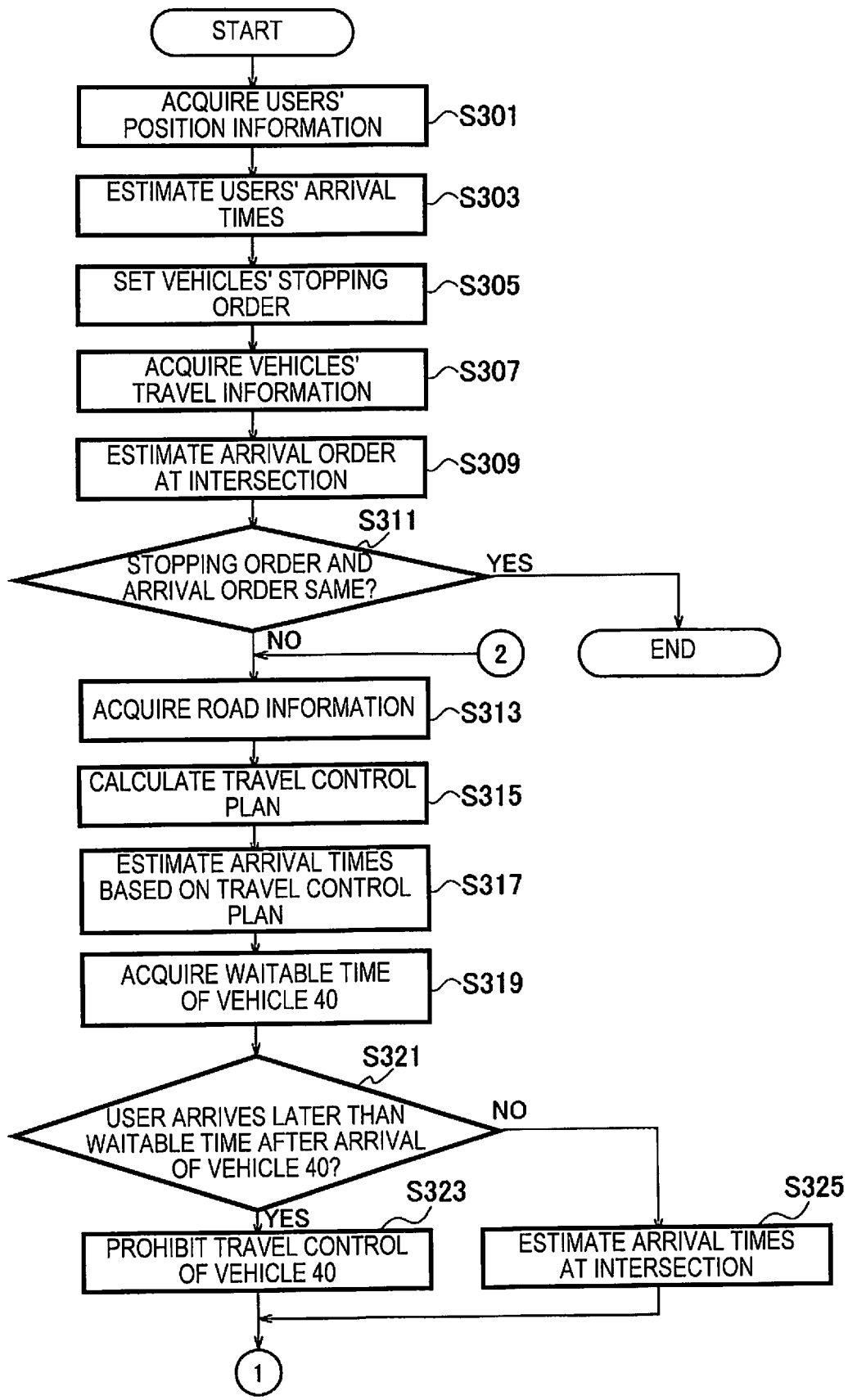
FIG. 12A is a flowchart describing another operation example of the controller according to a modified example of the present invention.
Figure 12B:
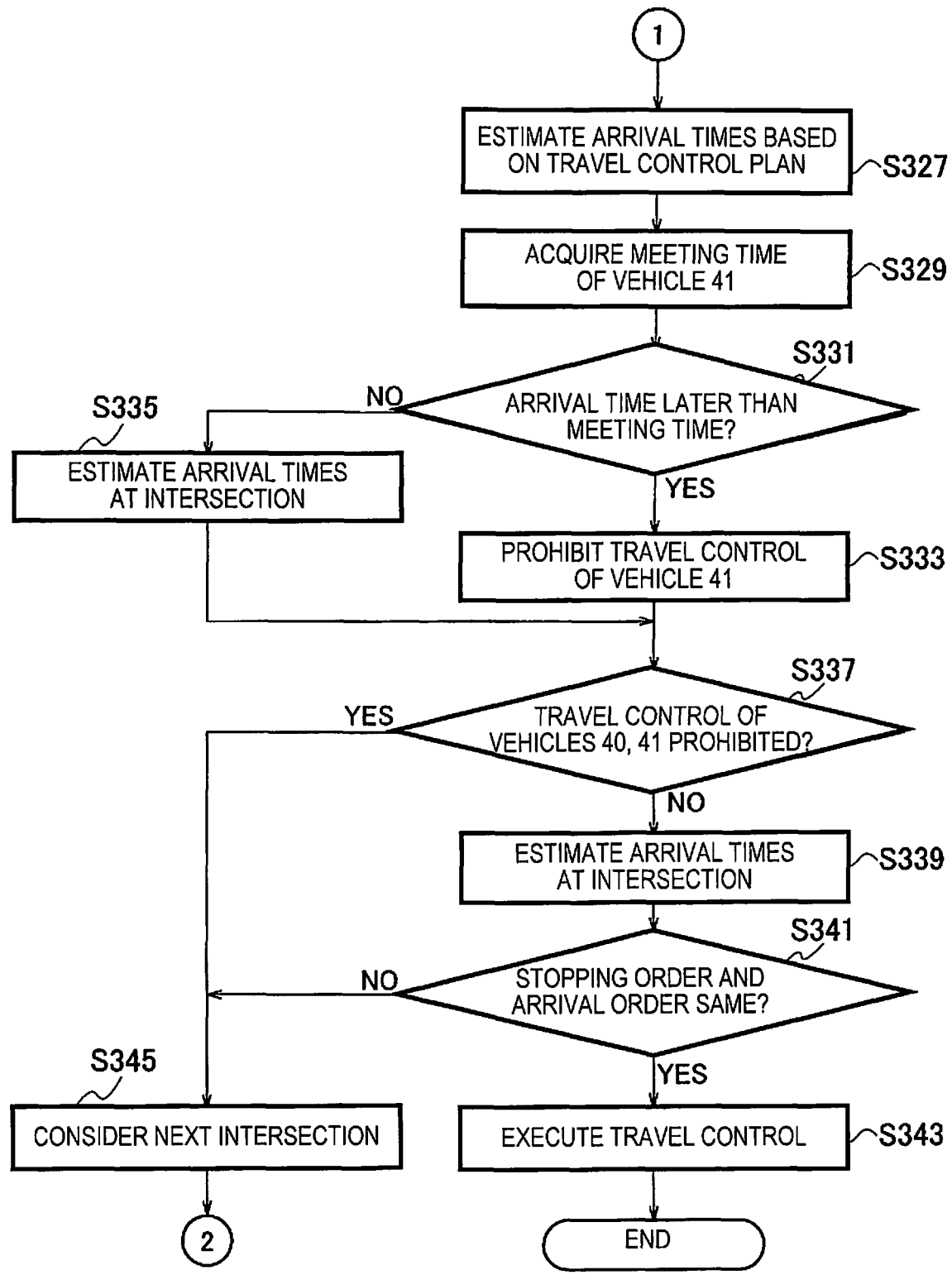
FIG. 12B is a flowchart describing another operation example of the controller according to a modified example of the present invention.

Next, an operation example of the controller 20 according to a modified example will be described with reference to the flow charts of FIGS. 12A and 12B.

Figure 11:
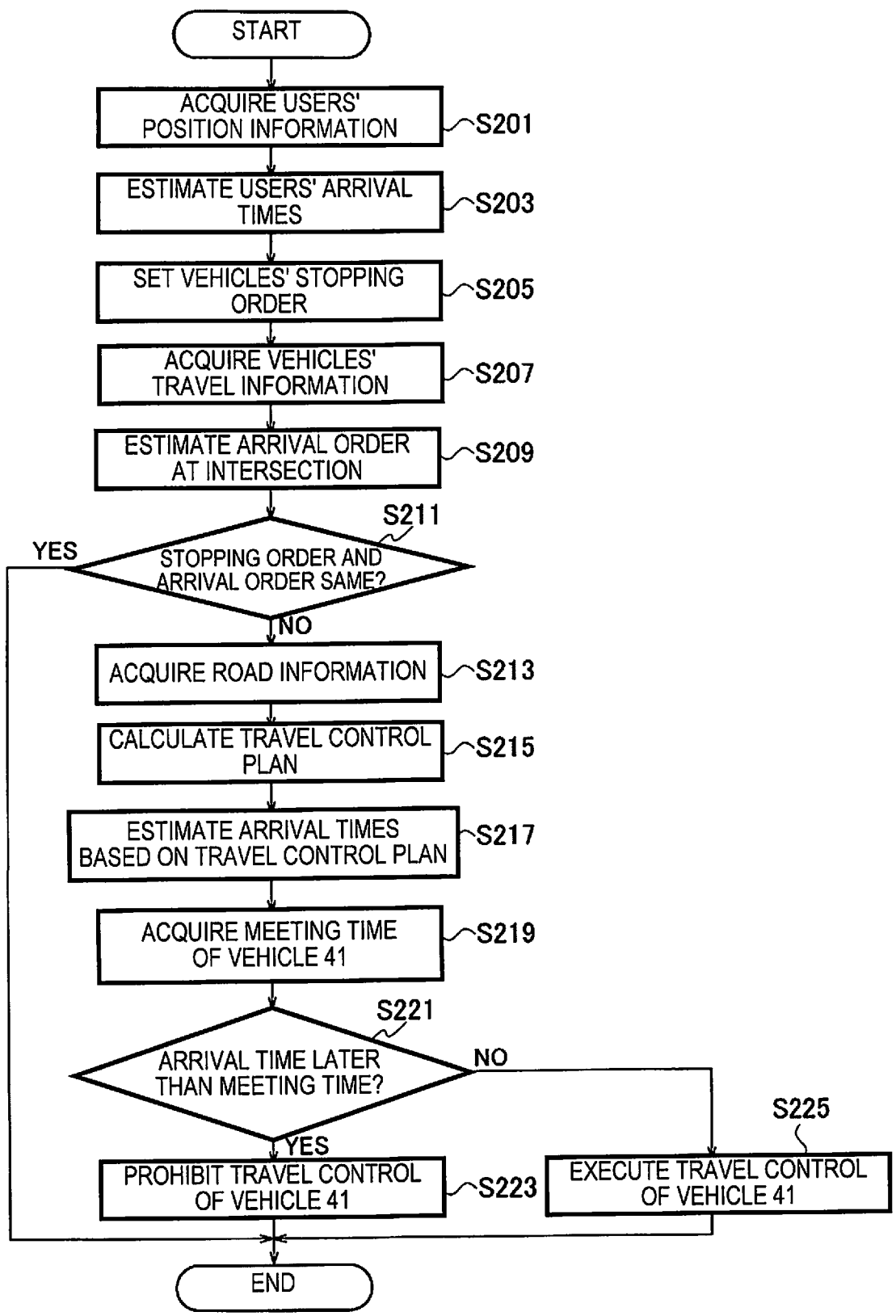
FIG. 11 is a flowchart describing an operation example of a controller according to a modified example of the present invention.

The processes of Steps S301-313 are the same as the processes of Steps S201-213 of FIG. 11, and their descriptions have been omitted.

In Step S315, the travel control unit 216 calculates a travel control plan for causing the vehicle 40 to arrive at the intersection 81 earlier. The travel control plan includes a plurality of controls, as described above. The process proceeds to Step S317, in which the travel control unit 216 estimates the time at which the vehicle 40 will arrive at the stopping area 70 when the travel of the vehicle 40 is controlled in accordance with the travel control plan.

The process proceeds to Step S319, in which the travel control unit 216 refers to the storage 24 in order to acquire the waitable time of the vehicle 40. If the user 50 will arrive at the stopping area 70 after the waitable time has elapsed since the arrival time (YES in Step S321), the travel control unit 216 prohibits control (Step S323). In the process of Step S323, it is assumed that the entire plurality of controls is prohibited, but the present invention is not limited in this way. In the process of Step S323, of the plurality of controls, the controls that cause the user 50 to arrive at the stopping area 70 after the waitable time has elapsed since the arrival time of the vehicle 40 may be prohibited.

On the other hand, if the user 50 will arrive at the stopping area 70 before the waitable time has elapsed since the arrival time (NO in Step S321), the travel control unit 216 estimates the time at which the vehicle 40 will arrive at the intersection 81 when the travel of the vehicle 40 is controlled in accordance with the travel control plan.

The processes of Steps S327-331 are the same as the processes of Steps S217-221 of FIG. 11, and their descriptions have been omitted. In the process of Step S333, it is assumed that the entire plurality of controls is prohibited, but the present invention is not limited in this way. In the process of Step S333, of the plurality of controls, the controls that cause the arrival time of the vehicle 41 to be later than the meeting time may be prohibited.

In Step S335, the travel control unit 216 estimates the time at which the vehicle 41 will arrive at the stopping area 70 when the travel of the vehicle 41 is controlled in accordance with the travel control plan. If the travel control of the vehicles 40, 41 is prohibited (YES in Step S337), the process proceeds to Step S345, in which the travel control unit 216 takes the next intersection 82 into consideration (refer to FIG. 7).

If the travel control of the vehicles 40, 41 is not prohibited (NO in Step S337), the process proceeds to Step S339, and the travel control unit 216 uses the times estimated in Step S325 and S335 to estimate the arrival order at the intersection 81. If the arrival order estimated in Step S339 is the same as the stopping order (YES in Step S341), the travel control unit 216 executes the travel control calculated in Step S315 (Step S343). On the other hand, if the arrival order estimated in Step S339 is not the same as the stopping order (NO in Step S341), the process proceeds to Step S345.

Action and Effects

As described above, the following actions and effects can be realized by means of the vehicle control system 10 according to the embodiment.

The stopping order setting unit 214 sets the stopping order, which indicates the order in which a plurality of vehicles (vehicles 40, 41) stop at the stopping area 70. Alternatively, the stopping order setting unit 214 sets the stopping order of the plurality of vehicles, which indicates the order at the stop locations in the stopping area 70. Thus, the arrival order estimation unit 215 acquires the position information of the vehicles 40, 41 and estimates, based on this acquired position information, the arrival order, which indicates the order in which the vehicles 40, 41 will arrive at the prescribed location. The travel control unit 216 determines whether the arrival order estimated by the arrival order estimation unit 215 differs from the stopping order. If it is determined that the arrival order differs from the stopping order, the travel control unit 216 controls the travel of at least one of the vehicles 40, 41 such that the arrival order will be the same as the stopping order by the time the vehicles 40, 41 arrive at the prescribed location. Making the order of arrival at the prescribed location the same as the stopping order increases the likelihood that the order of arrival at the stopping area 70 will be the same as the stopping order. Thus, the efficient use of the stopping area 70 can be realized.

Using the position information of the vehicles 40, 41, the arrival order estimation unit 215 calculates the arrival times at which the vehicles 40, 41 will arrive at the prescribed location. The arrival order estimation unit 215 then estimates the arrival order based on the calculated arrival times. The arrival order estimation unit 215 can thus accurately estimate the arrival order. In addition to the position information of the vehicles 40, 41, the arrival order estimation unit 215 may use the speed information of the vehicles 40, 41 to estimate the arrival order.

The prescribed location that is used when the arrival order is estimated includes an intersection through which both vehicles 40, 41 pass, or the stopping area 70. As a result, the travel control unit 216 is able to control the travel of the vehicles 40, 41 in order to make the order of arrival at the stopping area 70 the same as the stopping order by the time the vehicles 40, 41 arrive at the stopping area 70.

The travel control unit 216 acquires the speed of the flow of traffic for each lane of the road on which the vehicles 40, 41 travel. Of the vehicles 40, 41, the travel control unit 216 causes the vehicle 41, which is later in the stopping order, to change to a lane with a slower flow of traffic than the current travel lane. Alternatively, the travel control unit 216 causes the vehicle 40, which is earlier in the stopping order, to change to a lane with a faster flow of traffic than the current travel lane. The travel control unit 216 can thereby make the vehicle 41 arrive at the intersection 81 later. The travel control unit 216 can also make the vehicle 40 arrive at the intersection 81 earlier.

The travel control unit 216 calculates a plurality of routes via which the vehicles 40, 41 arrive at the intersection 81. The travel control unit 216 changes the route of the vehicle 41, which is later in the stopping order, to a route with a later time of arrival at the intersection 81 than the current route. Alternatively, the travel control unit 216 changes the route of the vehicle 40, which is earlier in the stopping order, to a route with an earlier time of arrival at the intersection 81 than the current route. The travel control unit 216 can thus make the vehicle 41 arrive at the intersection 81 later. The travel control unit 216 can also make the vehicle 40 arrive at the intersection 81 earlier.

The travel control includes a plurality of controls. The plurality of controls include lane changes to lanes with slower (faster) flows of traffic and route changes to routes with later (an earlier) times of arrival at the intersection 81 (stopping area 70). The travel control unit 216 estimates the time at which the vehicle 40, which is earlier in the stopping order, will arrive at the stopping area 70, as a result of controlling the travel. The travel control unit 216 refers to the storage 24 to acquire the waitable time which the vehicle 40, which is earlier in the stopping order, can take to wait for the user 50 (first user) who reserved the vehicle 40. The travel control unit 216 determines whether the user 50 will arrive at the stopping area 70 after the waitable time has elapsed since the arrival time. The travel control unit 216 prohibits control of the vehicle 40 for which it has been determined that the user 50 will arrive at the stopping area 70 after the waitable time has elapsed since the arrival time of the vehicle 40. It is thus possible to make the order of arrival at the intersection 81 the same as the stopping order and to prevent the vehicle 40 from departing without boarding the user 50.

Further, the travel control may include a control to cause at least the vehicle 40, which is earlier in the stopping order, to arrive at the prescribed location earlier. If it is determined that the user 50 will arrive at the stopping area 70 after the waitable time has elapsed, the controller 20 may prohibit control of the vehicle 40 which is earlier in the stopping order.

Further, the travel control unit 216 estimates the time at which the vehicle 41, which is later in the order of arrival, will arrive at the stopping area 70 as a result of controlling the travel of the vehicle 41. The travel control unit 216 refers to the user database 242 to acquire the meeting time of the vehicle 41, which is later in the stopping order, and the user 51 (second user) who reserved the vehicle 41. The travel control unit 216 determines whether the arrival time is later than the meeting time. The travel control unit 216 prohibits travel control of the vehicle 41, which is later in the stopping order, for which it has been determined that the arrival time is later than the meeting time. It is thus possible to make the order of arrival at the intersection 81 the same as the stopping order, and to prevent the vehicle 41 from arriving after the meeting time.

Further, the travel control may include control to cause at least the vehicle 41, which is later in the stopping order, to arrive at the prescribed location later. The controller 20 may prohibit control of at least the vehicle 41, which is later in the stopping order, when it is determined that the arrival time is later than the meeting time.

The stopping order setting unit 214 refers to the reservation information of the users 50, 51 and sets the stopping order, which indicates the order in which the vehicles 40, 41 will stop at the stopping area 70. The stopping order setting unit 214 can thus set a stopping order that is compatible with the reservation information of the users 50, 51.

The stopping order setting unit 214 acquires the position information of the users 50, 51. The position information of the users 50, 51 is the position information of the terminal devices 60, 61 in the possession of the users 50, 51. The stopping order setting unit 214 estimates, based on the position information of the users 50, 51, the arrival time of the user 50, which is the time that the user 50 arrives at the stopping area 70, and the arrival time of the user 51, which is the time that the user 51 arrives at the stopping area 70. The stopping order setting unit 214 sets the stopping order based on the arrival time of the user 50 and the arrival time of the user 51. Some users may arrive at the stopping area 70 later than the reservation time or arrive at the stopping area 70 earlier than the reservation time. By setting the stopping order using the position information of the users 50, 51, a stopping order can be set that is more convenient for the users 50, 51.

The stopping order setting unit 214 may acquire the position information of the terminal devices 60, 61 in the possession of the users 50, 51, respectively, when the users 50, 51 reserve vehicles.

Each of the functions described in the embodiments above may be implemented by means of one or more processing circuits. The processing circuits include programmed processing devices, such as processing devices that include electronic circuits. The processing circuits also include such devices as application-specific integrated circuits (ASIC) and electronic components arranged to perform the described functions.

Embodiments of the present invention have been described above, but the descriptions and figures that form part of this disclosure should not be understood as limiting the present invention. From this disclosure, various alternative embodiments, examples, and operating techniques should be apparent to those skilled in the art.

The travel control unit 216 may control the travel of the vehicles 40, 41 when the vehicle 40, which is earlier in the stopping order, or the vehicle 41, which is later in the stopping order, is located within a prescribed range of the stopping area 70. Alternatively, the travel control unit 216 may control the travel of the vehicles 40, 41 a prescribed time before the vehicle 40 or the vehicle 41 arrives at the stopping area 70. As a result, the travel control unit 216 is able to control the travel of the vehicles 40, 41 in order to make the order of arrival at the stopping area 70 the same as the stopping order by the time the vehicles 40, 41 arrive at the stopping area 70.

In the embodiment described above, it was explained that the travel control unit 216 prohibits control of the travel of the vehicle 41, which is later in the stopping order, for which the estimated time of arrival is later than the meeting time, but no limitation is implied thereby. For example, if the arrival time is later than the meeting time, the travel control unit 216 may negotiate a permissible delay of the meeting time with the user 51. This negotiation is carried out by displaying an image on the terminal device 61 in the possession of the user 51 for negotiating such a permissible delay. The user 51 operates the terminal device 61 and selects whether to permit the delay. If the user 51 permits the delay of the meeting time, that is, if a signal indicating that the delay has been allowed is transmitted from the terminal device 61 to the travel control unit 216, the travel control unit 216 executes the plurality of controls. The travel control unit 216 can thereby make the order of arrival at the intersection 81 the same as the stopping order.

If the arrival time is later than the meeting time, the travel control unit 216 may transmits information indicating a delay of the meeting time to the user 51. If the user 51 approves the delay of the meeting time, the travel control unit 216 may execute the control.

The invention claimed is:

1. A vehicle control method using a controller for executing a travel control of at least one vehicle from among a plurality of vehicles that stop in a stopping area for allowing users to board and deboard, the vehicle control method comprising:
   the controller
   setting a stopping order of the plurality of vehicles which indicates the vehicle order at a stop location in the stopping area;
   acquiring position information of the plurality of vehicles;
   estimating an arrival order which indicates the order in which the plurality of vehicles arrive at a prescribed location, based on the position information that was acquired;
   determining whether the arrival order that was estimated differs from the stopping order; and
   upon determining the arrival order is different from the stopping order, executing the travel control of at least one vehicle from among the plurality of vehicles such that the arrival order is the same as the stopping order by a time the plurality of vehicles arrive at the prescribed location,
   the travel control further including at least a control causing a vehicle which is later in the stopping order to arrive at the prescribed location later, and
   the controller further
   estimating an arrival time at which the vehicle which is later in the stopping order will arrive at the stopping area as a result of controlling the travel,
   acquiring a meeting time of the vehicle which is later in the stopping order and a second user who reserved the vehicle which is later in the stopping order,
   determining whether the arrival time is later than the meeting time, and
   upon determining that the arrival time is later than the meeting time, prohibiting the control causing the vehicle which is later in the stopping order to arrive at the prescribed location later.

2. The vehicle control method according to claim 1, wherein
   the controller
   uses the position information to calculate arrival times at which the plurality of vehicles will arrive at the prescribed location, and
   estimates the arrival order based on the arrival times that were calculated.

3. The vehicle control method according to claim 1, wherein
   the prescribed location includes an intersection through which the plurality of vehicles all pass, or the stopping area.

4. The vehicle control method according to claim 1, wherein
   the controller
   acquires a speed of a flow of traffic for each lane of a road on which the plurality of vehicles travel, and causes the vehicle from among the plurality of vehicles which is later in the stopping order to change to a lane with a slower flow of traffic than a current travel lane, or causes the vehicle from among the plurality of vehicles which is earlier in the stopping order to change to a lane with a faster flow of traffic than the current travel lane.

5. The vehicle control method according to claim 1, wherein
the controller
upon determining the arrival order is different from the stopping order, calculates a plurality of routes via which the plurality of vehicles will arrive at the prescribed location, and
changes the route of the vehicle which is later in the stopping order to a route with an arrival time for the prescribed location that is later than the current route, or changes the route of the vehicle which is earlier in the stopping order to a route with an arrival time that is earlier than the current route.

6. The vehicle control method according to claim 1, wherein
the controller
transmits information indicating a delay of the meeting time to the second user upon determining the arrival time is later than the meeting time, and
cancels the prohibition and executes the control of the vehicle which is later in the stopping order upon determining the second user approves the delay of the meeting time.

7. The vehicle control method according to claim 1, wherein
the controller controls the travel upon determining the vehicle which is earlier in the stopping order or the vehicle which is later in the stopping order is located within a prescribed range of the stopping area.

8. The vehicle control method according to claim 1, wherein
the controller refers to reservation information of a plurality of users to set the stopping order.

9. The vehicle control method according to claim 1, wherein
the controller
acquires position information of terminal devices possessed by each of a plurality of users when the plurality of users reserve the vehicles,
estimates arrival times at which the plurality of users will arrive at the stopping area based on the position information of the terminal devices that was acquired, and
sets the stopping order based on the arrival times of the plurality of users.

10. The vehicle control method according to claim 1, wherein
the stopping area is an area where two or more vehicles of the plurality of vehicles can stop simultaneously, and
the stopping order is an order of stopping positions along a traveling direction of the two or more vehicles at the stopping area.

11. A vehicle control device for executing a travel control of at least one vehicle from among a plurality of vehicles that stop in a stopping area for allowing users to board and deboard, the vehicle control device comprising:
a controller configured to
set a stopping order of the plurality of vehicles which indicates the vehicle order at a stop location in the stopping area;
acquire position information of the plurality of vehicles;
estimate an arrival order which indicates the order in which the plurality of vehicles arrive at a prescribed location, based on the position information that was acquired;
determine whether the arrival order that was estimated differs from the stopping order; and
upon determining the arrival order is different from the stopping order, execute the travel control of at least one vehicle from among the plurality of vehicles such that the arrival order is the same as the stopping order by a time the plurality of vehicles arrive at the prescribed location,
the travel control further including at least a control causing a vehicle which is later in the stopping order to arrive at the prescribed location later, and
the controller being further configured to
estimate an arrival time at which the vehicle which is later in the stopping order will arrive at the stopping area as a result of controlling the travel,
acquire a meeting time of the vehicle which is later in the stopping order and a second user who reserved the vehicle which is later in the stopping order,
determine whether the arrival time is later than the meeting time, and
upon determining that the arrival time is later than the meeting time, prohibit the control causing the vehicle which is later in the stopping order to arrive at the prescribed location later.

12. The vehicle control device according to claim 11, wherein
the stopping area is an area where two or more vehicles of the plurality of vehicles can stop simultaneously, and
the stopping order is an order of stopping positions along a traveling direction of the two or more vehicles at the stopping area.

13. A vehicle control system for executing a travel control of at least one vehicle from among a plurality of vehicles that stop in a stopping area for allowing users to board and deboard, the vehicle control system comprising:
a terminal to be possessed by one of the users; and
a controller configured to communicate with the vehicle, wherein
the controller being configured to
set a stopping order of the plurality of vehicles which indicates the vehicle order at a stop location in the stopping area;
acquire position information of the plurality of vehicles;
estimate an arrival order which indicates the order in which the plurality of vehicles arrive at a prescribed location, based on the position information that was acquired;
determine whether the arrival order that was estimated differs from the stopping order; and
upon determining the arrival order is different from the stopping order, execute the travel control of at least one vehicle from among the plurality of vehicles such that the arrival order is the same as the stopping order by a time the plurality of vehicles arrive at the prescribed location,
the travel control further including at least a control causing a vehicle which is later in the stopping order to arrive at the prescribed location later, and
the controller being further configured to
estimate an arrival time at which the vehicle which is later in the stopping order will arrive at the stopping area as a result of controlling the travel, acquire a meeting time of the vehicle which is later in the stopping order and a second user who reserved the vehicle which is later in the stopping order, determine whether the arrival time is later than the meeting time, and upon determining that the arrival time is later than the meeting time, prohibit the control causing the vehicle which is later in the stopping order to arrive at the prescribed location later.

14. The vehicle control system according to claim 13, wherein the stopping area is an area where two or more vehicles of the plurality of vehicles can stop simultaneously, and the stopping order is an order of stopping positions along a traveling direction of the two or more vehicles at the stopping area.

15. A vehicle control method using a controller to execute a travel control of at least one vehicle from among a plurality of vehicles that stop in a stopping area for allowing users to board and deboard, the vehicle control method comprising:

the controller setting a stopping order of the plurality of vehicles which indicates the vehicle order at a stop location in the stopping area;

acquiring position information of the plurality of vehicles;

estimating an arrival order which indicates the order in which the plurality of vehicles arrive at a prescribed location, based on the position information that was acquired;

determining whether the arrival order that was estimated differs from the stopping order; and upon determining the arrival order is different from the stopping order, executing the travel control with respect to at least one vehicle from among the plurality of vehicles such that the arrival order is the same as the stopping order by a time the plurality of vehicles arrive at the prescribed location, the travel control further including at least a control causing a vehicle which is earlier in the stopping order to arrive at the prescribed location earlier, and the controller further estimating an arrival time at which the vehicle which is earlier in the stopping order will arrive at the stopping area, as a result of the travel control, acquiring a waitable time, which is a time that the vehicle which is earlier in the stopping order can wait for a first user who reserved the vehicle which is earlier in the stopping order, acquiring position information of the first user, determining whether the first user will arrive at the stopping area after the waitable time has elapsed since the arrival time based on the position information of the first user that was acquired, and upon determining that the first user will arrive at the stopping area after the waitable time has elapsed, prohibiting the control causing the vehicle which is earlier in the stopping order to arrive at the prescribed location earlier.

16. A vehicle control device for executing a travel control of at least one vehicle from among a plurality of vehicles that stop in a stopping area for allowing users to board and deboard, the vehicle control device comprising:

a controller configured to set a stopping order of the plurality of vehicles which indicates the vehicle order at a stop location in the stopping area;

acquire position information of the plurality of vehicles;

estimate an arrival order which indicates the order in which the plurality of vehicles arrive at a prescribed location, based on the position information that was acquired;

determine whether the arrival order that was estimated differs from the stopping order; and upon determining the arrival order is different from the stopping order, execute the travel control of at least one vehicle from among the plurality of vehicles such that the arrival order is the same as the stopping order by a time the plurality of vehicles arrive at the prescribed location, the travel control further including at least a control causing a vehicle which is earlier in the stopping order to arrive at the prescribed location earlier, and the controller being further configured to estimate an arrival time at which the vehicle which is earlier in the stopping order will arrive at the stopping area, as a result of the travel control, acquire a waitable time, which is a time that the vehicle which is earlier in the stopping order can wait for a first user who reserved the vehicle which is earlier in the stopping order, acquire position information of the first user, determine whether the first user will arrive at the stopping area after the waitable time has elapsed since the arrival time based on the position information of the first user that was acquired, and upon determining that the first user will arrive at the stopping area after the waitable time has elapsed, prohibit the control causing the vehicle which is earlier in the stopping order to arrive at the prescribed location earlier.

17. A vehicle control system for executing a travel control of at least one vehicle from among a plurality of vehicles that stop in a stopping area for allowing users to board and deboard, the vehicle control system comprising:

a terminal to be possessed by one of the users; and a controller configured to communicate with the vehicle, wherein the controller being configured to set a stopping order of the plurality of vehicles which indicates the vehicle order at a stop location in the stopping area;

acquire position information of the plurality of vehicles;

estimate an arrival order which indicates the order in which the plurality of vehicles arrive at a prescribed location, based on the position information that was acquired;

determine whether the arrival order that was estimated differs from the stopping order; and upon determining the arrival order is different from the stopping order, execute the travel control of at least one vehicle from among the plurality of vehicles such that the arrival order is the same as the stopping order by a time the plurality of vehicles arrive at the prescribed location, the travel control further including at least a control causing a vehicle which is earlier in the stopping order to arrive at the prescribed location earlier, and the controller being further configured to estimate an arrival time at which the vehicle which is earlier in the stopping order will arrive at the stopping area, as a result of the travel control, acquire a waitable time, which is a time that the vehicle which is earlier in the stopping order can wait for a first user who reserved the vehicle which is earlier in the stopping order, acquire position information of the first user, determine whether the first user will arrive at the stopping area after the waitable time has elapsed since the arrival time based on the position information of the first user that was acquired, and upon determining that the first user will arrive at the stopping area after the waitable time has elapsed, prohibit the control causing the vehicle which is earlier in the stopping order to arrive at the prescribed location earlier.

* * * * *